United States Patent [19]

Weiss et al.

[11] Patent Number: 5,557,341
[45] Date of Patent: Sep. 17, 1996

[54] ITERATIVE METHOD FOR ESTIMATING MOTION CONTENT IN VIDEO SIGNALS USING SUCCESSIVELY REDUCED BLOCK SIZE

[75] Inventors: Peter Weiss, Hagersten; Björn Christensson, Bandhagen, both of Sweden

[73] Assignee: DV Sweden AB, Stockholm, Sweden

[21] Appl. No.: 133,089

[22] PCT Filed: Apr. 3, 1992

[86] PCT No.: PCT/SE92/00219

§ 371 Date: Oct. 8, 1993

§ 102(e) Date: Oct. 8, 1993

[87] PCT Pub. No.: WO92/19068

PCT Pub. Date: Oct. 29, 1992

[30] Foreign Application Priority Data

Apr. 12, 1991 [SE] Sweden ............................ 9101113

[51] Int. Cl.$^6$ .................... H04N 5/14; H04N 9/64
[52] U.S. Cl. .................. 348/699; 348/415; 348/411; 348/412
[58] Field of Search ................... 348/699, 700, 348/416, 409, 412, 417, 410

[56] References Cited

U.S. PATENT DOCUMENTS

| | | | |
|---|---|---|---|
| 4,691,230 | 9/1987 | Kaneko et al. | 358/105 |
| 4,796,087 | 1/1989 | Guichard et al. | 358/136 |
| 4,800,425 | 1/1989 | Schwerzel et al. | 358/136 |
| 4,853,779 | 8/1989 | Hammer et al. | 358/133 |
| 4,924,310 | 5/1990 | von Brandt | 358/136 |
| 4,937,666 | 6/1990 | Yang | 358/136 |
| 4,989,087 | 1/1991 | Pele et al. | 358/136 |
| 5,151,784 | 2/1992 | Lavagetto et al. | 348/699 |
| 5,173,772 | 12/1992 | Choi | 348/699 |
| 5,193,001 | 3/1993 | Kerdranvrat | 358/105 |

FOREIGN PATENT DOCUMENTS

| | | |
|---|---|---|
| 0406074 | 1/1991 | European Pat. Off. . |
| WO91/03797 | 3/1991 | WIPO . |

OTHER PUBLICATIONS

"A Spatio–Temporal Gradient Method for Estimating the Displacement Field in Time–Varying Imagery," Paquin, et al., *Computer Vision, Graphics, And Image Processing*, No. 21, pp. 205–221 (1983).

"Displacement Measurement and Its Application in Interframe Image Coding," Jaswant R. Jain, *IEEE Transactions on Communications*, vol. COM–29, No. 12, pp. 1799–1808, Dec. 1981.

"Motion–Compensated Television Coding: Part I," Netravali et al., *The Bell System Technical Journal*, vol. 58, No. 3, pp. 631–670, Mar. 1979.

Primary Examiner—Tommy P. Chin
Assistant Examiner—Anand S. Rao

[57] ABSTRACT

A block matching method for estimating motion contents in a video signal is presented. The motion is represented by a two-dimensional motion vector field, including horizontal and vertical vector components. The method can be used in a wide range of applications, has high spatial and motion vector resolution, is robust under adverse signal conditions, and is cost effective in real-time implementations. The block matching method includes iterative processing with different block sizes from coarse to fine with prediction of motion vectors from surrounding blocks. Resolution of each iteration's block size is preserved at the same resolution as the original input video signal for which the motion vector field is being generated.

24 Claims, 6 Drawing Sheets

ITERATIVE METHOD FOR ESTIMATING MOTION CONTENT IN VIDEO SIGNALS USING SUCCESSIVELY REDUCED BLOCK SIZE

BACKGROUND OF THE INVENTION

The invention relates generally to a method for estimating motion contents in video signals, said motion being normally represented by a two-dimensional motion vector field, including horizontal and vertical vector components. The general purpose of such an estimation is to allow high quality temporal transformation or processing of video signals. The invention can be applied in a variety of fields, some important examples being: conversion between different television signal standards, noise reduction of video signals, data compression for digital transmission of television or high definition television signals, and slow-motion devices.

Known methods of generating motion vector fields include recursive pixel gradient methods, phase correlation and block matching techniques. Each technique has its own set of advantages and disadvantages with respect to the following generally desirable features:

A: High tracking range involving the ability to track objects moving at high speed, as a result of using a large search area;
B: High vector resolution involving the ability to generate a detailed description of the motion vectors of moving objects, as a result of discriminating different velocities and directions of movement of neighbouring blocks.
C: High spatial resolution involving the ability to describe different movement of small adjacent areas of moving objects, as a result of discriminating neighbouring pixels with different movement.
D: Robust algorithm involving the ability to distinguish the true motion of an object by generating a motion vector field while suppressing noise and other disturbances; and
E: Cost effectiveness (effective signal processing and simple implementation) involving the ability to use the method commercially for a wide range of applications.

The advantages and disadvantages of the known methods appear from the table below:

|  | Pixel gradient | Phase correlation | Standard block matching |
| --- | --- | --- | --- |
| A: High tracking range | NO | YES | YES |
| B: High vector resolution | YES | YES | YES |
| C: High spatial resolution | YES | NO | NO |
| D: Robust algorithm | NO | YES | NO |
| E: Cost effectiveness | YES | NO | YES |

In the standard block matching technique (compare, e.g. U.S. Pat. No. 4,924,310), the video signal is represented by a consecutive sequence of pictures separated in time, and said pictures are divided into blocks of predetermined orientation and size. The block size will determine the spatial resolution of the vector field. To enable comparison or matching of blocks, one has to define a search area with a certain size and shape, a search pattern, according to which the search or comparison will be carried out, and a matching criterion representing the degree of likeness of one block to another. Such a criterion is based on a comparison of light intensity or luminance of the individual picture elements (pixels).

For the purpose of determining the momentary motion vector field, two consecutive pictures are regarded. The blocks, made up of a number of pixels of the current consecutive picture, are processed in order. For every such block a search is carried out in the search area of the previous consecutive picture, according to the search pattern, so as to match said block to a block in the previous consecutive picture. The direction and the value of the relative displacement of the two matching blocks are selected as the motion vector of the block in the current picture. A complete momentary motion vector field is obtained after blockwise processing of the entire content of the current picture.

SUMMARY OF THE INVENTION

The present invention concerns an improved method using the block matching technique, and is specially adapted for cost effective real-time applications.

The particular problem to be solved by this improved method of block matching is to increase the spatial resolution and to provide robustness in the algorithm. According to the invention, the algorithm is based on hierarchical processing with different block sizes from coarser to finer with the calculation of predicted motion vectors from surrounding blocks and, preferably, post processing by non-linear filtering of the motion vector field after each hierarchical search step, as well as motion adaptive temporal filtering after calculation of the motion vector field.

More specifically, the invention provides a method for generating a motion vector field in video signals, the method being characterized in that each search step (S1, S2 etc) for each block of the present picture involves the calculation of a predicted motion vector (PMV) based on motion vectors ($A_m$, $C_m$ and $E_{m-1}$, $G_{m-1}$ respectively), if any, already obtained in the present search step and, possibly, motion vectors from at least one previous search step of the present picture and possibly also from at least one preceding picture, said predicted motion vector (PMV) thus corresponding to a predicted new displaced position for the associated block (RB) of the present picture (PN), and that said predetermined search area (SA) is positioned so as to surround said predicted new displaced position, and in that said predetermined search area (SA) and said pattern are adapted in size to the present block size between two consecutive search steps.

Suitable further developments of the invention are defined in the dependent claims and will be explained below.

BRIEF DESCRIPTION OF THE DRAWINGS

A preferred embodiment of the invention will be described below with reference to the accompanying drawings, wherein.

DESCRIPTION OF A PREFERRED EMBODIMENT

Figure 1:
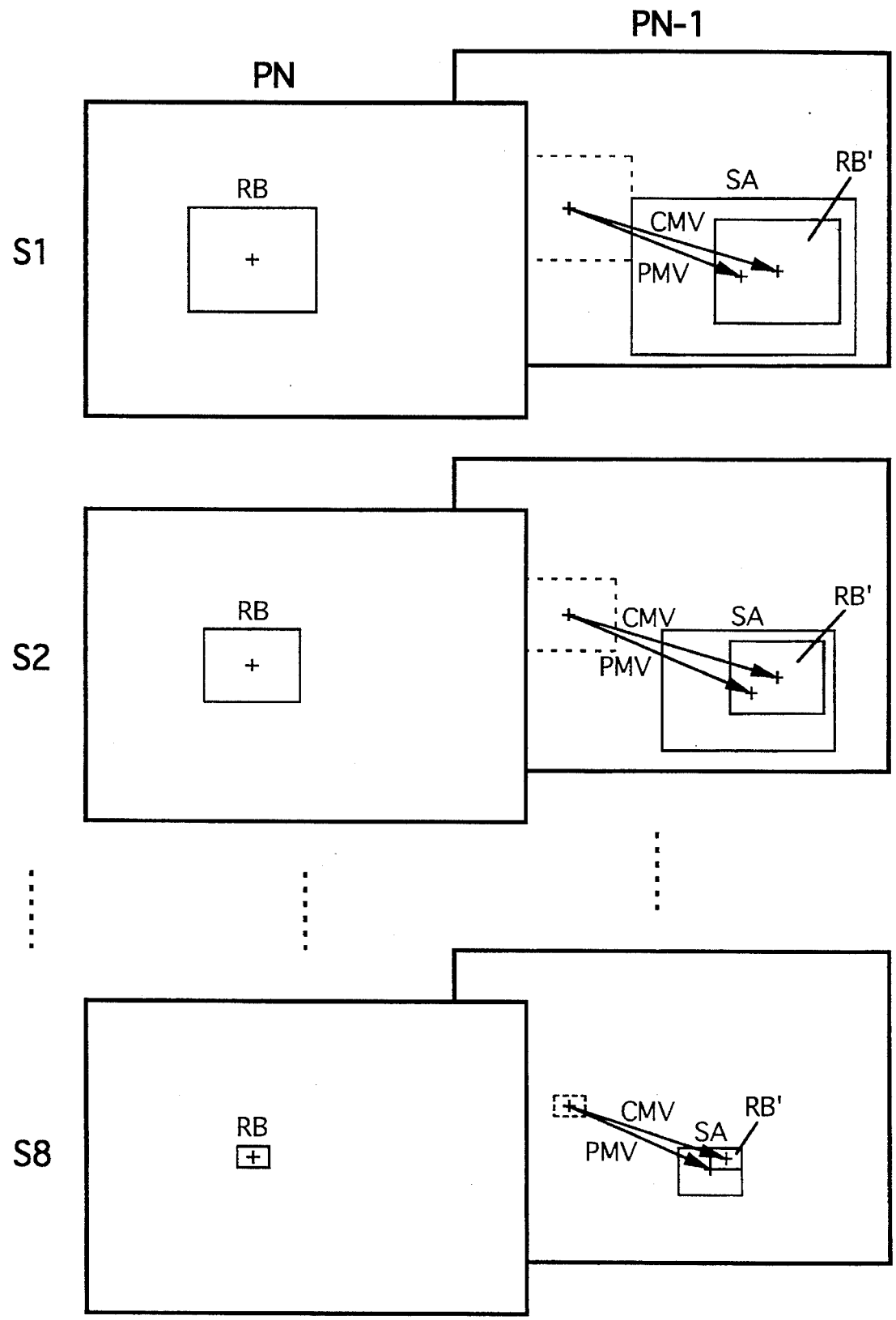
FIG. 1 illustrates the principle for matching of blocks in two consecutive pictures with the use of hierarchical search steps and predicted motion vectors.

FIG. 1 illustrates different search steps S1, S2 . . . S8 with gradually reduced block size (e.g. starting with a block size of 24 lines by 32 pixels and then reducing the block sides by half between each step until no further reduction is possible). In each such search step blocks of a present picture PN are processed in order. At the end of each step all blocks of the present picture PN have been assigned a motion vector that describes the displacement of each block in relation to its position in a previous picture PN−1 (the algorithm is not limited to regarding an immediately preceding picture). Regarding one of the blocks of the present picture PN, referred to as a reference block RB, the assignment of a motion vector to said block, in the first search step S1, will be described below.

The block RB of the present picture PN and a number of different blocks RB' (only one is shown in FIG. 1) of the previous picture PN−1 are compared as to different possible relative displacements represented by different candidate motion vectors CMV, by calculating a matching criterion EM based on the difference in pixel-wise light intensity values, i.e. an energy measure according to the formula:

$$EM = \sum_i \sum_j |X^{PN}_{i,j} - X^{PN-1}_{k,j+1}|$$

where $X_{ij}^{PN}$ are light intensity values of the pixels of RB, $X_{i+k,j+l}^{PN-1}$ are light intensity values of the pixels of RB', the upper indices to which picture the bock belongs, the lower indices indicate rows and columns of a block, and k,l are the horizontal and vertical componets of a candidate motion vector CMV.

Figure 3A:
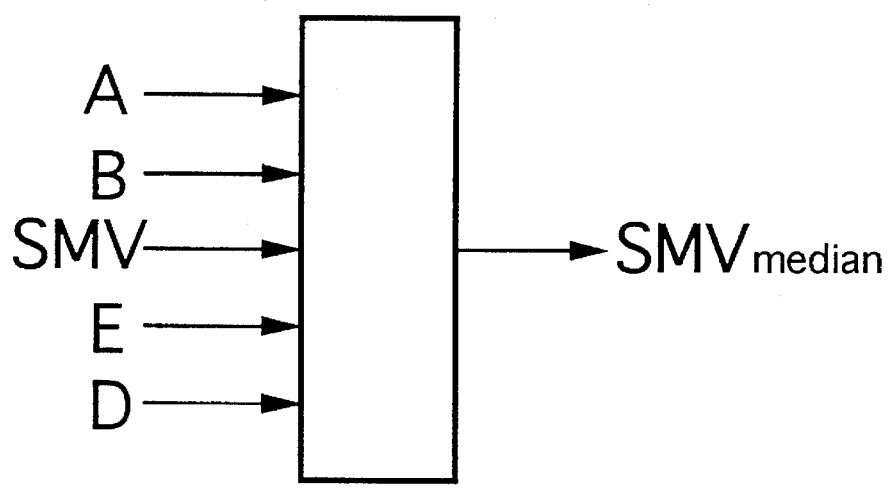
FIG. 3a illustrates a median filter.
Figure 3B:
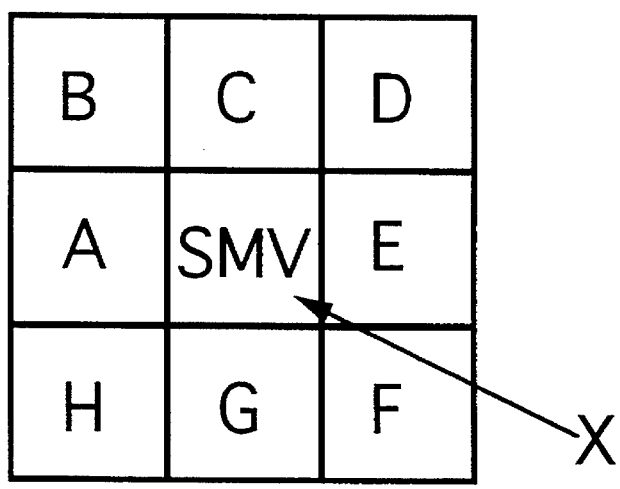
FIG. 3b illustrates the motion vectors used to process a resulting motion vector after each search step.
Figure 4:
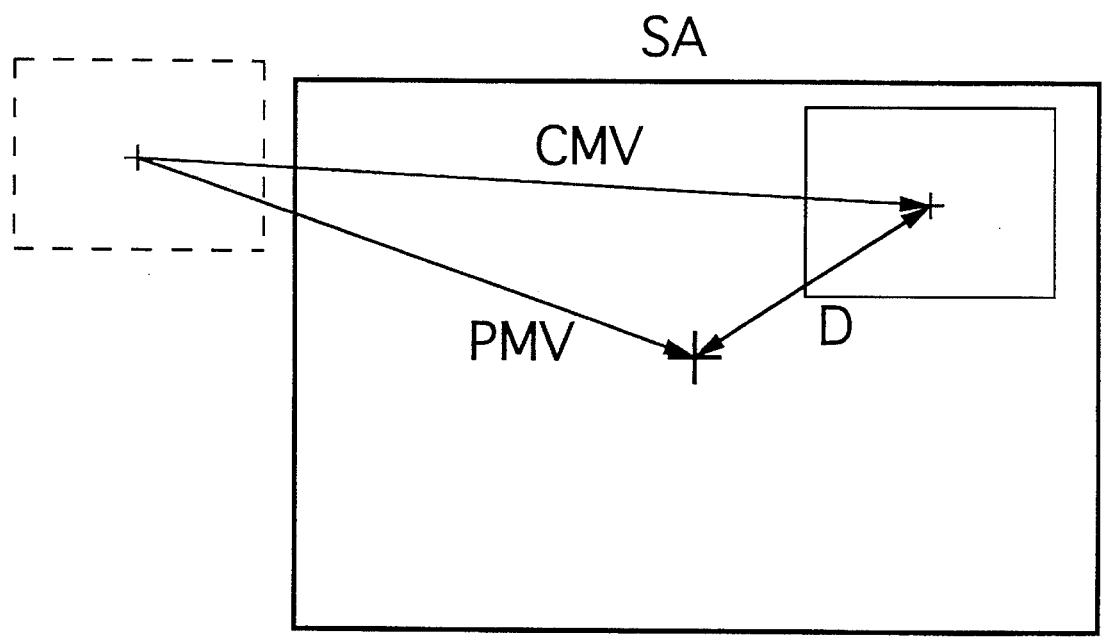
FIG. 4 illustrates a distance represented by the difference between two vectors, said distance being used for calculating a penalty value to be added to the matching criterion.
Figure 5:
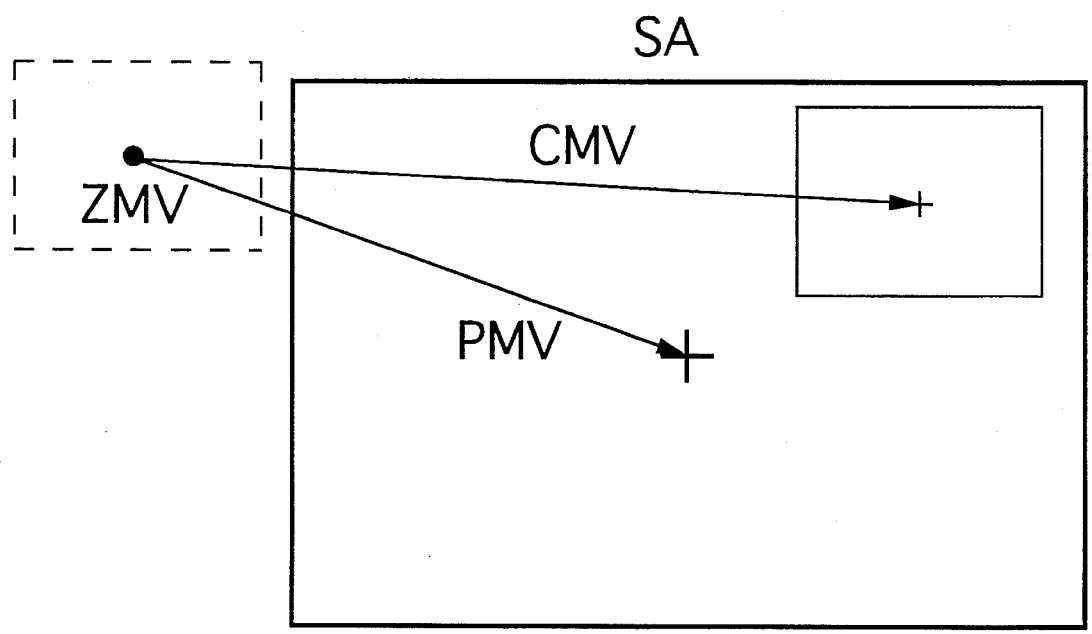
FIG. 5 illustrates a zero motion vector combined with a predicted and a candidate motion vector to form a zero motion vector test.

Also, additional conditions, to be described in conjunction with the description of FIGS. 4 and 5, are used in combination with the matching criterion EM. The blocks RB' are distributed according to a search pattern within a search area SA located in the previous picture PN−1, said search area SA being positioned at a location determined by a predicted motion vector PMV, which will be described in conjunction with the description of FIG. 2. When the matching criteria EM for all blocks RB' in the search area SA have been calculated, the block RB is assigned the candidate motion vector CMV corresponding to the relative displacement of the matching block RB' that minimizes the matching criterion EM, said assigned motion vector being referred to as the selected motion vector SMV (cf. FIG. 3).

The above procedure is thus carried out for all blocks RB of the present picture PN in the first search step S1 and in the same manner for all blocks of the present picture PN in the search steps S2, . . . , S8, for which the search area SA and the search pattern are scaled down in proportion to the reduction in block size between each search step. Preferably, a search step is started as soon as enough motion vector information is avaliable, i.e. different search steps will be carried out simultaneously and overlapping.

Figure 2:
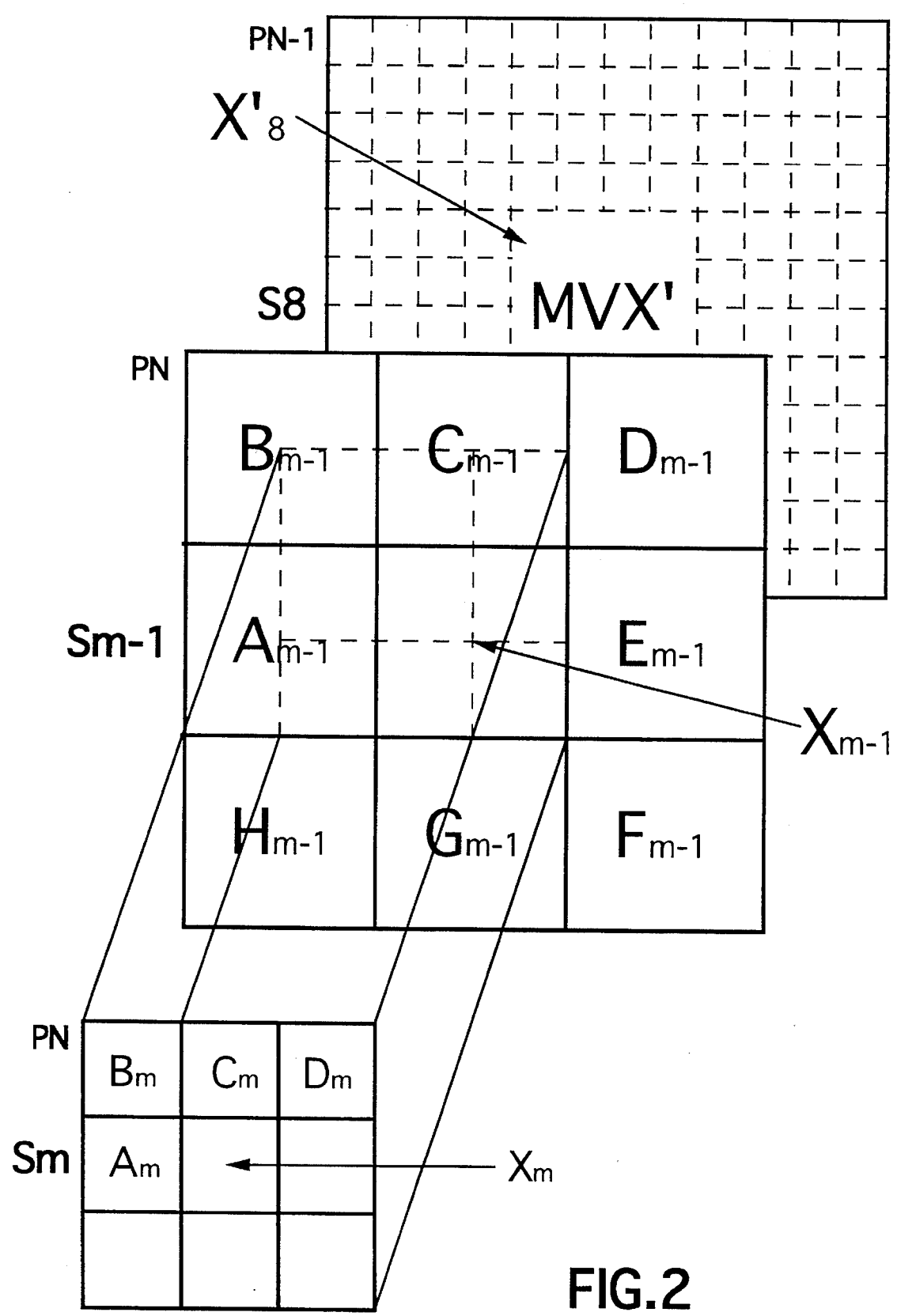
FIG. 2 illustrates the motion vectors (denoted by letters) available from adjacent blocks to be used to predict a motion vector for the next search step.

Reference is now made to FIG. 2 which illustrates motion vectors (denoted by letters with index m−1) in adjacent larger blocks of a preceding search step Sm−1 (or any other preceding search step in the present or in any previous picture) and motion vectors (denoted by letters with index m) in adjacent blocks of the present search step Sm, all available for the calculation of a predicted motion vector PMV (FIG. 1) for the reference block in the position $X_m$ of the present picture in search step Sm. It is advantageous to use an isotropic predictor for calculating the precited motion vector PMV, taking into account motion vector information from all directions surrounding the reference block in the position $X_m$, for which block a motion vector is to be predicted. The predicted motion vector PMV may be calculated as $PMV = 0.25 \times A_m + 0.25 \times C_m + 0.25 \times E_{m-1} + 0.25 \times G_{m-1}$ which is a combination of motion vectors $A_m$ and $C_m$ in the present search step Sm and motion vectors Em−1 and Gm−1 from the preceding search step Sm−1 with larger blocks.

The predicted motion vector PMV is used to determine the position for the search area, within which the search for a block, which matches the reference block, is carried out. The search area is centered in a position in the previous picture, said position corresponding to the vectorial sum of the position of the center of the reference block of the present picture and the product of a scalar Q and the predicted motion vector PMV. The scalar Q may take on the value 1.0, in which case the search area is centered around a position displaced by the predicted motion vector relatively to the position of the center of the reference block of the present picture.

In addition to using a spatial isotropic predictor only, it is advantageous to combine the spatial isotropic predictor with a temporal predictor, i.e. taking into account motion vector information from motion vectors belonging to motion vector fields already determined for a previous picture PN−1. The position for the regarded block $X_m$ in the present picture corresponds to the an area $X_8$ in the previous picture PN−1, and the combineed motion vector MVX' for said area is used for the prediction. The predicted motion vector PMV may in this case be calculated as $PMV = 0.125 \times A_m + 0.125 \times C_m + 0.125 \times E_{m-1} + 0.125 \times G_{m-1} + 0.5 \times MVX'$. Specifically, for the first search step for every picture this procedure is necessary, since no motion vector information is avaliable from any preceding search step of the present picture. Also, the calculation of predicted motion vectors for blocks at corners or edges of a picture may differ somewhat from the above description.

Preferably, as illustrated schematically in FIGS. 3a and 3b, a non-linear processing of motion vectors is carried out after each search step. The selected motion vector SMV, for the block in the position X, is processed by a five tap median filter and is then replaced by the mathematical median value SMV median=median of [A,B,D,E,SMV].

FIG. 4 illustrates a distance D, upon which a penalty value, to be added to the matching criterion EM, is based. The sum of the matching criterion EM and the penalty value forms a new matching criterium $EM_{CMV}$ for a candidate motion vector CMV. This distance D is being the absolute value of the difference between the predicted motion vector PMV and the candidate motion vector CMV for the present reference block within the search area. This candidate motion vector CMV, is assigned to the present reference block only if its matching criterion $EMN_{CMV}$ is better than that of the predicted motion vector PMV or better than that of any other candidate motion vector.

Reference is now made to FIG. 5 which illustrates that a zero motion vector matching criterion EMzmv for a block displaced by a zero motion vector ZMV, representing no motion, is compared to every reference block displaced by a candidate motion vector CMV within the search area and that the zero motion vector ZMV can be selected if the zero motion vector matching criterion EMzmv is better than the matching criterion EM for all candidate motion vectors CMV.

Figure 6A:
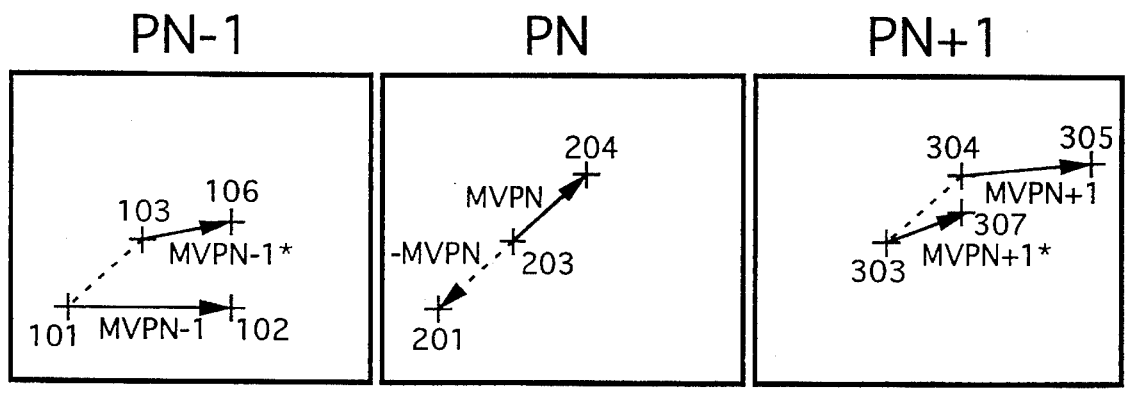
FIG. 6a illustrates motion vectors for a moving object in three consecutive pictures.

FIG. 6a illustrates three motion vectors MVPN−1, MVPN (and its inversion −MVPN), MVPN+1 represented by arrows asserted between spatial positions 101 and 102, 203 and 204, 304 and 305 respectively, said motion vectors belonging respectively to blocks (in a moving object) in three consecutive pictures PN−1, PN, PN+1, wherein positions 101, 201, positions 103, 203, 303, and positions 204, 304 represent the same spatial positions respectively in the different pictures.

Figure 6B:
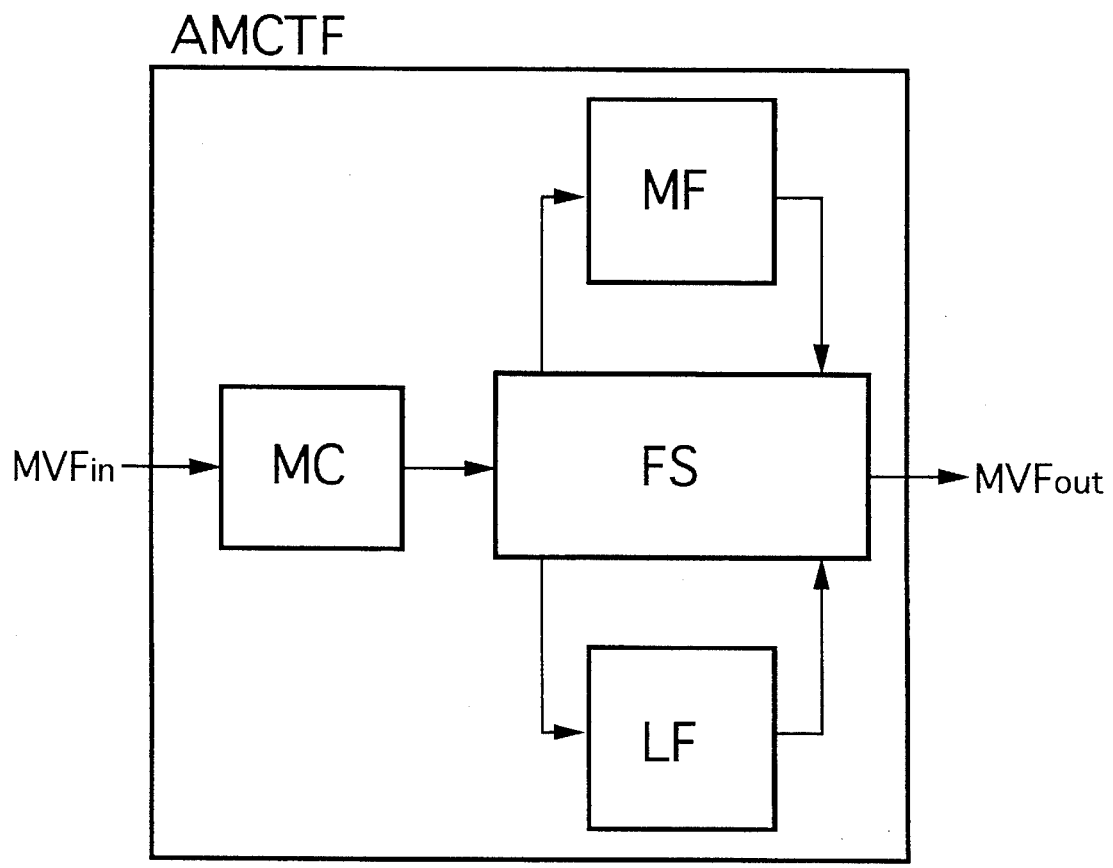
FIG. 6b illustrates an adaptive motion compensated temporal filter used for temporal post processing.

In order to further improve the quality and smoothness of the the motion vector field as well as to remove occasional spourious vectors temporal post processing of the motion vection field is employed over several consecutive pictures. For the temporal post processing, said motion vector field $MVF_{in}$ is fed into an adaptive motion compensated temporal filter AMCTF, shown in FIG. 6b, in which a motion compensator MC compensates for the motion of an object and a filter selector FS selects either a median filter MF or a linear filter LF, whereupon a filtered motion vector field $MVF_{out}$ is obtained from the adaptive motion compensated temporal filter AMCTF.

Said three motion vectors in the three consecutive pictures of FIG. 6a are assumed to belong to the same moving object, for which the difference in position must be taken into account in order to find the motion vectors for the same point of said object in the three consecutive pictures. The motion vector field $MVFN_{in}$ is input to the motion compensator MC, which then for the processing of the motion vector MVPN outputs the motion vector MVPN in picture PN, the motion vector in picture PN−1 asserted in a position corresponding to the assertion position of MVPN subtracted by MVPN, and the motion vector in picture PN+1 asserted in a position corresponding to the assertion position of MVPN added by MVPN. The three output motion vectors are thus the motion vectors MVPN−1, MVPN, and MVPN+1 shown in FIG. 6a.

If the difference between the motion vectors MVPN and MVPN−1 as well as between MVPN and MVPN+1 is large, it can be assumed that MVPN is incorrect and the filter selector FS selects the median filter MF, which replaces MVPN by the median value of said three motion vectors. On the other hand, if the difference between the respective motion vectors is small, the filter selector FS selects the linear filter LF, which replaces MVPN by a linear combination of the three motion vectors.

In addition to the three motion vectors described above, FIG. 6a shows two motion vectors MVPN−1° and MVPN+1° represented by arrows asserted between said spatial positions 103 and 106, 303 and 307, respectively, said motion vectors, belonging respectively to blocks in positions 103 and 303 in said pictures. Said motion compensator MC may also output motion vectors MVPN−1° and MVPN+1° which may replace MVPN−1 and MVPN+1 in the median filter MF.

Although the invention has been described in conjunction with a preferred embodiment, it is to be understood that various modifications may be made without departing from the spirit and scope of the invention as defined by the appended claims.

For example, the predicted motion vector may be the result of an adaptive function of motion vectors as well as of other picture-related parameters.

Moreover, the comparison being made in said search pattern may be carried out in either forward or reverse picture sequences.

Finally, the invention can be applied to multi-dimensional motion vector fields.

We claim:

1. An iterative block-matching method for determining a final motion vector for blocks of a predetermined minimum size, the block being within a selected image $I_s$, the selected image $I_s$ being one in a sequence of digital images, the method using successively reduced block size of the same resolution as blocks of previous sizes, the method comprising the steps of:

a) selecting one of the images in the sequence as the selected image $I_s$;

b) dividing the selected image $I_s$ into blocks of a predetermined maximum size;

c) selecting at least one reference image $I_r$ from among the remaining images in the sequence for comparison against the selected image $I_s$;

d) selecting one of the blocks of pixels, within the selected image $I_s$, upon which to operate;

e) determining a motion vector between the selected block within the selected image $I_s$ and a corresponding area within the reference image $I_r$;

wherein the step e) includes the steps f)–i) as follows:

f) predicting a motion vector for the selected block as a function of at least one predetermined motion vector value,
      the predicted motion vector representing predicted movement of the selected block between a position $P_0$ in the selected image $I_s$ and a position $P_p$ in the reference image $I_r$;

g) establishing, according to a predetermined search pattern, a plurality of meta blocks in the reference image $I_r$ such that each meta block is located near the position $P_p$,
      the search pattern being a configuration of search points,
      each meta block having a center located on a search point;

h) determining a degree of similarity between each meta block and the selected block by calculating a matching criterion; and i) selecting the meta block with the matching criterion that most probably corresponds to actual motion of the selected block between the selected image $I_s$ and the reference image $I_r$,
      thereby selecting a temporary motion vector pointing between the position P0 in the selected block and the search point about which is centered the selected meta block;

j) repeatedly performing, until there is selected a temporary motion vector for each of the blocks of the selected image $I_s$, the substeps of:
      j1) selecting another block of pixels as the selected block from among the remaining block or blocks, within the selected image $I_s$, upon which to operate; and
      j2) performing the step e) for the newly selected block;

k) repeatedly performing, until there is selected a temporary motion vector for each of the blocks of the predetermined minimum size within the selected image $I_s$, the substeps of:

k1) reducing, if the size of the selected block is greater than the predetermined minimum size, the size of the selected block by dividing the selected image $I_s$ into smaller blocks, while preserving the resolution thereof; and k2) performing the steps d)–k); and l) establishing, after the step j), the temporary motion vector as the final motion vector for each of the predetermined minimum size blocks in the selected image $I_s$, thereby forming a final motion vector field therefor.

2. A method as in claim 1, wherein:

the predetermined minimum block size is one pixel.

3. A method as in claim 1, wherein:

the steps j) and k) are parallelized in at least one of the following manners:
   the step j) is performed simultaneously for more than one selected block;
   the step k) is performed simultaneously for more than one block size; and
   the steps j) and k) are performed simultaneously.

4. A method as in claim 1, further comprising:

m) processing the final motion vector field using an adaptive motion-compensated temporal filter.

5. A method as in claim 1, wherein the step i) includes:

i1) determining a median value as a non-linear function of the temporary motion vector and other closely located motion vectors; and i2) replacing the temporary motion vector with the median value.

6. A method as in claim 1, wherein:

the selected image and the reference image are consecutive images.

7. A method as in claim 1, wherein:

the selected image and the reference image are non-consecutive images.

8. A method as in claim 1, wherein:

the reference image is a preceding image.

9. A method as in claim 1, further comprising:

m) performing, after a first iteration of the steps a)–l), a second iteration of the steps a)–l) for an additional pair of images.

10. A method as in claim 1, wherein:

the prediction of the step f) is isotropic.

11. A method as in claim 1, wherein:

the matching criterion is EM, wherein $$EM = \sum_i \sum_j |X_{i,j}^{I_s} - X_{i+m,j+l}^{I_r}|$$

and where $X_{i,j}^{I_s}$ is a light intensity value of a pixel in the block of the selected image $I_s$, $X_{i+m,j+l}^{I_r}$ is a light intensity value of a corresponding pixel in the meta block in the reference image $I_r$, where i and j are the numbers of the row and column, respectively, of the pixel, and where m and l are the horizontal and vertical displacements, respectively, of the search point in the meta block.

12. A method as in claim 1, wherein:

the matching criterion includes at least a basic term and a penalty term, such that the penalty term penalizes a search point based upon distance between the search point and the position $P_p$, thereby favoring search points that are closer to the position $P_p$.

13. A method as in claim 1, wherein the step i) includes:

i1) calculating matching criterion for a zero vector at $P_0$; and i2) selecting the zero motion vector as the temporary vector if the matching criterion for the zero vector most probably corresponds to actual motion of the selected block between the selected image $I_s$ and the reference image $I_r$.

14. A method as in claim 1, wherein:

one of the search points in the search pattern is the position $P_p$.

15. A method as in claim 1, wherein:

the search pattern includes 5 search points configured such that the first of the 5 search points is the position $P_p$ and the remaining four search points correspond to corners of a square centered on $P_p$.

16. A method as in claim 1, wherein:

the search pattern includes 9 search points configured as a 3×3 matrix.

17. A method as in claim 1, wherein the step h) includes:

h1) determining in parallel the matching criteria for all of the meta blocks, respectively.

18. A method as in claim 1, wherein:

a predetermined motion vector value includes at least one of
   a motion vector determined for the selected image $I_s$, and
   a motion vector determined for the reference image $I_r$.

19. A method as in claim 11, wherein:

each meta block is the same size as the selected block.

20. A method as in claim 9, wherein:

one image in the additional pair of images is the same as in the first iteration of the steps a)–l).

21. A method as in claim 16, wherein:

the center point of the 3×3 matrix is the position $P_p$.

22. A method as in claim 18, wherein:

a motion vector value for the selected image $I_s$ includes at least one of
   a motion vector determined for another block of the same size, and
   a motion vector determined for another block of a different size.

23. A method as in claim 22, wherein:

the prediction of the step f) is a linear combination of a plurality of predetermined motion vector values.

24. A method as in claim 23, wherein:

the linear combination is weighted so as to favor at least one of
   motion vector values that are derived from a reference image $I_r$ that is closer in time to the selected image $I_s$, and
   motion vector values that are derived for points in the reference image $I_r$ that are closer to the position $P_p$.

* * * * *